(12) United States Patent  
Lamarche

(10) Patent No.: US 7,171,908 B2
(45) Date of Patent: Feb. 6, 2007

(54) HIGH/LOW PASSENGER INGRESS AND EGRESS CONVERSION FOR TRANSIT VEHICLE

(75) Inventor: Francois Lamarche, Pierrefonds (CA)

(73) Assignee: Wabtec Holding Corp., Wilmerding, PA (US)

( * ) Notice: Subject to any disclaimer, the term of this patent is extended or adjusted under 35 U.S.C. 154(b) by 192 days.

(21) Appl. No.: 10/802,632

(22) Filed: Mar. 17, 2004

(65) Prior Publication Data

US 2004/0211336 A1    Oct. 28, 2004

Related U.S. Application Data

(60) Provisional application No. 60/455,939, filed on Mar. 19, 2003.

(51) Int. Cl.
*B61D 23/00* (2006.01)

(52) U.S. Cl. .................. 105/449; 105/450; 105/443; 280/166

(58) Field of Classification Search ............ 105/449, 105/425, 429, 430, 437, 443, 341, 426, 427, 105/438, 447, 282.3, 250, 450; 280/166; 414/522; 296/155
See application file for complete search history.

(56) References Cited

U.S. PATENT DOCUMENTS

| | | | | |
|---|---|---|---|---|
| 3,924,545 A | * | 12/1975 | Anders et al. | 105/450 |
| 4,058,228 A | * | 11/1977 | Hall | 414/549 |
| 4,081,091 A | * | 3/1978 | Thorley | 414/545 |
| 4,536,004 A | * | 8/1985 | Brynielsson et al. | 280/166 |
| 4,874,197 A | * | 10/1989 | Grable | 296/162 |
| 5,205,603 A | * | 4/1993 | Burdette, Jr. | 296/62 |
| 5,230,288 A | * | 7/1993 | Bickel | 105/425 |
| 5,357,869 A | * | 10/1994 | Barjolle et al. | 105/436 |
| 5,671,684 A | * | 9/1997 | Lucas | 105/305 |
| 6,435,600 B1 | * | 8/2002 | Long et al. | 296/155 |
| 6,571,718 B2 | * | 6/2003 | Lucas | 105/282.3 |
| 2002/0153744 A1 | * | 10/2002 | Long et al. | 296/155 |

\* cited by examiner

*Primary Examiner*—Frantz F. Jules
(74) *Attorney, Agent, or Firm*—James Ray & Assoc.

(57) ABSTRACT

A passenger ingress and egress system within a transit vehicle having a stairwell employs a movable platform apparatus in combination with at least one door of a sliding or plug type to accommodate variations in passenger ingress and egress platform facilities. The movable platform apparatus disposed under the floor section of the transit vehicle for interface with the low platform is deployed outwardly toward the outer surface of the transit vehicle for interface with the high platform. The travel of such movable platform apparatus can be achieved manually or assisted by a power drive mechanism. A locking means is provided for securing such movable platform apparatus at both deployed and stowed positions and can be manually overridden via a cable connected to the remotely mounted handle. Obstruction detection means is further provided to prevent deployment of the movable platform apparatus upon passenger presence within the stairwell. Provisions are incorporated to meet American with Disability Act regulations in respect to the vertical displacement between the movable platform apparatus and the floor section of the transit vehicle.

15 Claims, 9 Drawing Sheets

HIGH/LOW PASSENGER INGRESS AND EGRESS CONVERSION FOR TRANSIT VEHICLE

CROSS-REFERENCE TO RELATED APPLICATIONS

This application is related to and claims priority from U.S. Provisional Patent Application Ser. No. 60/455,939 filed on Mar. 19, 2003. This application is further related to the invention disclosed in U.S. Pat. No. 6,139,073 titled "Lock Assembly" and to the invention disclosed in U.S. Pat. No. 5,775,232 titled "Bridgeplate for a Mass Transit Vehicle", both assigned to the assignee of the present invention. The teachings of U.S. Pat. Nos. 6,139,073 and 5,775,232 are incorporated into this document by reference thereto.

FIELD OF THE INVENTION

The present invention relates to a transit vehicle utilizing a combination of a door system with a stairwell disposed adjacent the door system and, more particularly, the present invention relates to a High/Low platform conversion apparatus for accommodating varying platform height conditions for passenger ingress and egress.

BACKGROUND OF THE INVENTION

Two different platform conditions exist for passenger ingress and egress onto and from a transit vehicle. The first condition relates to passenger ingress and egress from and onto a ground level or a stationary platform with a horizontal surface of under 14 inches in height above ground level This condition is hereinafter referred to as a low platform. The second condition relates to the passenger ingress and egress from and onto a stationary platform having a horizontal surface which is greater than 14 inches in height above ground level and is typically level with the floor of the transit vehicle. This condition is hereinafter referred to as a high platform.

One approach to accommodate varying platform types is to incorporate a passenger ingress and egress system including a stationary stairwell disposed within a floor surface in combination with a stairwell platform pivotally connected to one side of an upper horizontal plane of the stairwell and manually displaceable to lie in the horizontal plane over the stairwell for accommodating high platforms. The main disadvantage of the stairwell platform is that it does not meet Federal Regulation regarding Americans with Disabilities Act, hereinafter referred to as ADA regulations that the horizontal displacement, generally referred to as the gap, between the high platform edge and stairwell platform of the transit vehicle, with its doors open, can not exceed 3 inches. Due to the gap (or clearance) between the edge of the platform and the outer surface of the transit vehicle being approximately between 2 inches and 3 inches, the outer wall of the transit vehicle being between 2 inches and 3 inches in width, the door construction typically between 1 inch and 2 inches in width, the outer edge of the stairwell platform is approximately between 5 inches and 8 inches away from the edge of the high platform with the doors of a sliding type in a fully open position.

A well-known approach overcoming the gap between the stairwell platform and high platforms is to employ a movable threshold mechanically coupled with the door having a recess or containing multiple door sections, which extends into the cavity occupied by the door thus minimizing the gap.

U.S. Pat. No. 5,070,794 describes a railway vehicle door comprising bottom and top door members, sliding with respect to each other, and connected by locking means. The lower door member is for covering the stairwell opening for passenger loading from a high platform. The door is mounted so as to slide between a closed position and an open position. A stairwell platform is fixed so as to be articulated on an axis substantially perpendicular to the door and is situated substantially in the horizontal plane of the top of the steps, such platform being able to be moved from a vertical position and a position of use in which it is situated in the horizontal plane. A threshold member projects with respect to the external face of the door in order to fill in at least part of the space lying between the edge of the stairwell platform, in the position of use, and the edge of the railway platform. This threshold member is an integral part of the bottom member.

Another approach described in U.S. Pat. No. 6,401,629 utilizes a door having a single member and a threshold at least partially disposed within a recess formed in the door. The vehicle body comprises means for supporting the end of the threshold, which are disposed close to the edge of the door opening opposite to the direction of opening of the door, when the door is open. The means for supporting the end of the threshold element comprise, for example, rollers carried by the end of the threshold and abutment surfaces receiving the rollers fixed to the vehicle body.

The guide means between the threshold member and the door include a rail fixed to the threshold extending in the longitudinal direction of the threshold and projecting from the end of this threshold in the direction of opening of the door, and a slide on which the rail slides, the slide being fixed to the body and having a length at least equal to the length of the threshold.

In the first aspect, the main disadvantage of the prior art system is the complexity of door and threshold construction and protrusion of the threshold beyond the outer wall of the transit vehicle during movement.

In the second aspect, the stairwell platform, when not in use for high platform ingress and egress, is disposed in the first position vertically above the stairwell occupying an additional space and being exposed to the riding passengers.

In the third aspect, this type of gap reduction approach can be only utilized with a single sliding type door, which relies on the adjacent end of the car structure opening to support the threshold. It is well known in the art that a bi-parting type sliding door system can be employed within a door opening of a transit vehicle, requiring both doors to open simultaneously in opposite directions with no support structure available in the center of such opening.

Even though a sliding type door system, particularly of a pocket configuration, is used predominantly in transit service, a plug type door system disposed flush with the outer surface of the transit vehicle and moving first outwardly and then linearly in relationship to such outer surface can be employed in either a single or bi-parting configurations. Such plug type door system, preferable for its esthetics and environment sealing capabilities as well as preferable for elimination of the interior wall of the transit vehicle cannot be utilized with the stationary stairwell platform and a threshold as described above.

Additionally a sliding type door, linearly movable substantially along the outer surface, can be further employed in a transit vehicle for elimination of its interior wall.

As it can be seen from the above discussion there is a need to provide a cost effective approach for accommodating high and low platform boarding which is particularly configured to interface with a biparting door system configuration either of a sliding or plug door type.

ADA regulations further mandate that a vertical displacement between high platform and floor section preferably does not exceed 0.5 inches with the first 0.25 inches disposed in a vertical plane and with the second 0.25 inches disposed at 45 degree angle. Additional vertical displacement exceeding 0.5 inches must be angularly disposed within 1:6 slope, or about 10.5 degrees to enable ingress and egress of passengers with disabilities and, particularly, those passengers with disability using a wheelchair.

Considerations must be also given to prevent any potential interference between a moving stairwell platform and a passenger(s) occupying the stairwell at the time of such movement. This situation is accentuated when applied to unattended stairwell platform operation.

SUMMARY OF THE INVENTION

The present invention provides a passenger ingress and egress system disposed within a transit vehicle for accommodating a low platform and further accommodating a high platform. Such passenger ingress and egress system comprises a movable platform apparatus having a movable platform disposed under a floor portion of the transit vehicle in the first or stowed position for interface with the low platform and deployed outwardly toward the outer surface of the transit vehicle to second and third positions for interface with the high platform. The deployment and retraction movement of the movable platform apparatus can be accomplished manually or assisted by a power drive apparatus of various well-known types.

Guide means are disposed within the cavities of the stairwell side walls and are of a predetermined configuration to cooperate with the rolling elements attached to the movable platform member.

A locking means comprising at least one lock engaging at least one lock pin are provided to positively secure such movable platform member in the deployed or third position and in the stowed or first position. Such locking means can be manually unlocked via cable and a remotely mounted and easily reachable handle.

Obstruction detection means attachechable to the movable platform and/or disposed within the stairwell side walls prevent deployment of such movable platform when the passenger is present in the stairwell structure.

The floor section of the transit vehicle can be sloped or contain a hinged cover member to meet ADA regulations, when applicable, for vertical displacement with a movable platform. Accordingly, such movable platform can be sloped after deployment to further meet ADA regulations.

Since the movable platform is not mechanically coupled to at least one door for at least partial covering and uncovering a door portal aperture of the transit vehicle, such at least one door may be of a sliding or plug type.

OBJECTS OF THE INVENTION

It is therefore one of the primary objects of the present invention to provide a means for accommodating passenger ingress and egress from and onto a low platform and a high platform.

A further object of the present invention is to provide a means for accommodating passenger ingress and egress from and onto a low platform and a high platform in combination with a sliding type door system of either a single or biparting door configuration.

Yet a further object of the present invention is to provide a means for accommodating passenger ingress and egress from and onto a low platform and a high platform in combination with a plug type door system of either a single or biparting door configuration.

Still a further object of this invention is to provide a means for accommodating passenger ingress and egress from and onto a low platform and a high platform, which do not include a stairwell platform exposed to passengers when not in use.

Another object of the present invention is to provide a means for accommodating passenger ingress and egress from and onto a low platform and a high platform employing a simple one-piece door construction without a recess.

Yet another object of the present invention is to provide a means for accommodating passenger ingress and egress from and onto a low platform and a high platform employing locking provisions.

An additional object of the present invention is to provide a means for accommodating ingress and egress of disabled passengers from and onto a high platform that meets ADA Regulations.

These and various other objects and advantages of the present invention will become more readily apparent to those persons skilled in the relevant art from the following more detailed description, particularly, when such description is taken in conjunction with the attached drawings and the appended claims.

DESCRIPTION OF THE PREFERRED AND ALTERNATIVE EMBODIMENTS

Figure 1:
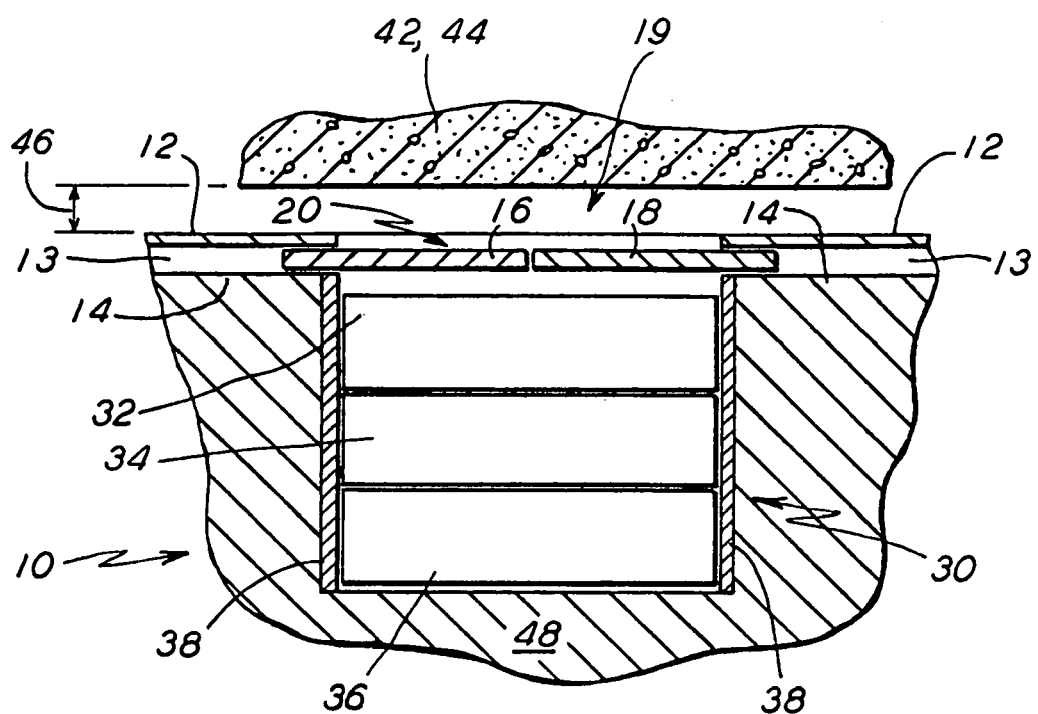
FIG. 1 is a partial horizontal cross sectional view of a doorway of a transit vehicle showing a pair of bi-parting sliding doors in the closed position.
Figure 8:
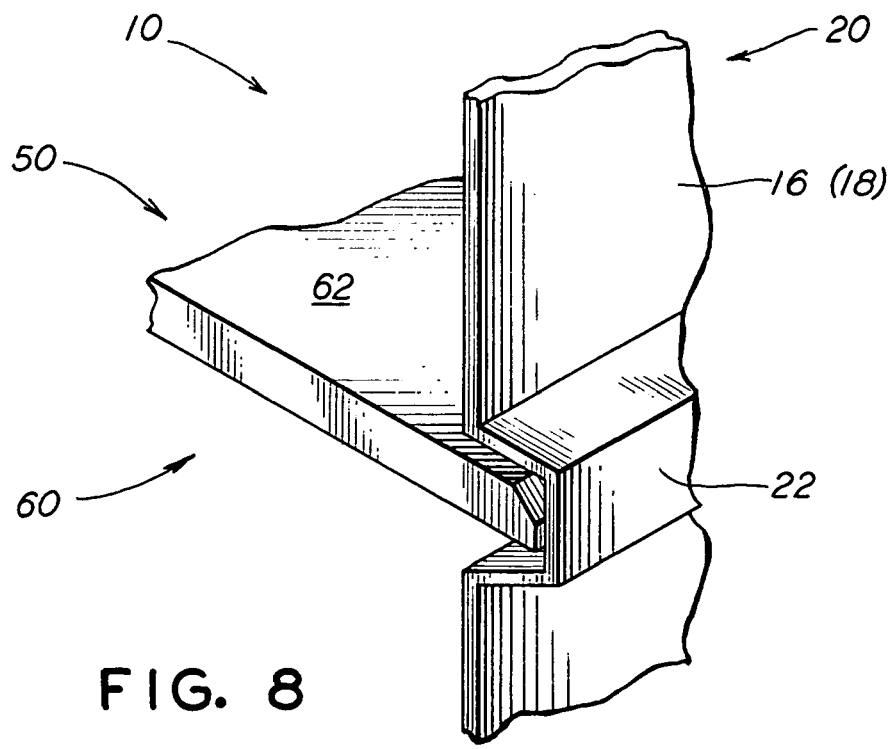
FIG. 8 is a partial perspective view of the present embodiment, particularly showing an alternative sliding door construction embodiment.
Figure 2:
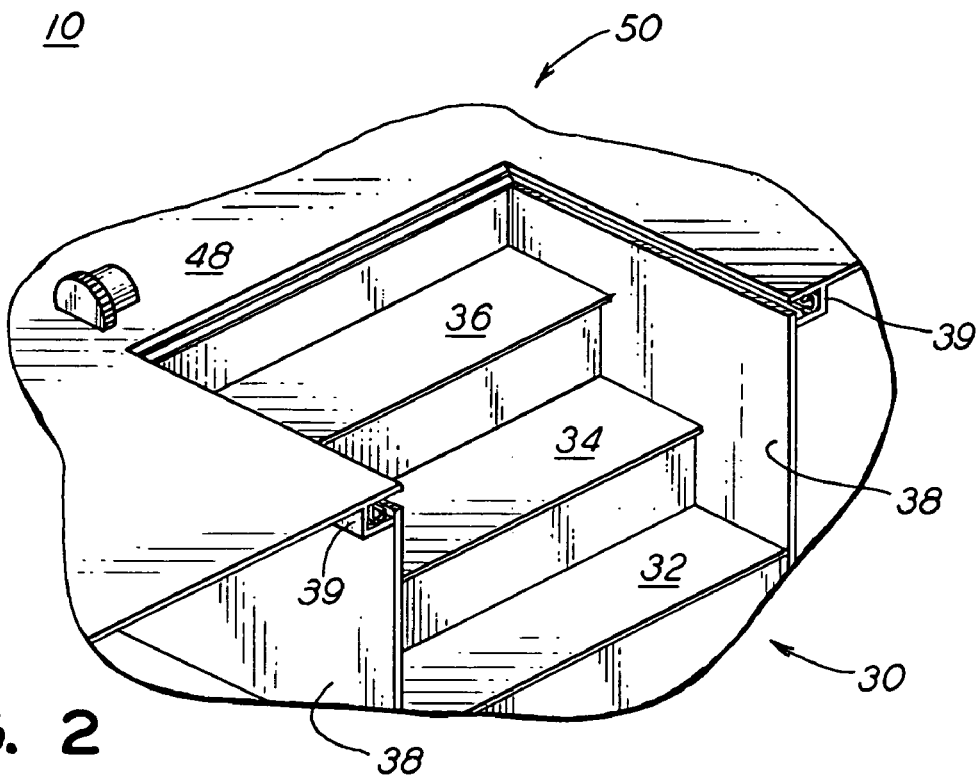
FIG. 2 is a perspective view of the stairwell of the transit vehicle.

Prior to proceeding to the more detailed description of the present invention, it should be noted that for the sake of clarity identical components, having identical functions have been identified with identical reference numerals throughout the several views, which have been illustrated in the drawing figures.

The invention disclosed herein largely overcomes the above discussed difficulties through the use of a passenger ingress and egress conversion system employing a movable platform apparatus disposed adjacent both a door portal aperture and a stairwell of a transit vehicle. The movable platform apparatus having a platform member disposed substantially under the stationery floor of the transit vehicle in a first position and extending into the stairwell for substantial covering of such stairwell in the second position. The platform member further extends to a third position to fill at least part of the gap in compliance with ADA regulations for ingress and egress from and onto a high platform when the door(s) open.

In reference to FIG. 1 of the present embodiment, a transit vehicle, generally designated 10, is illustrated having at least an outer wall 12 and further having an inner wall 14 enclosing a pair of door cavities 13. A door portal aperture, generally designated 20, formed through the outer and inner walls having a door portal aperture closure means, generally designated 19. A stairwell, generally designated 30, formed in a floor portion 48 of the transit vehicle 10 is located adjacent the door portal aperture 20.

Such door portal aperture closure means 19 comprise a first door 16 and a second door 18 of a bi-parting arrangement which are shown in a substantially closed position. The first door 16 and second door 18 are movable in a substantially linear path into a pair of door cavities 13 to uncover such door portal aperture 20 for passenger ingress and egress. The first door 16 and the second door 18 may contain a pair of simply formed recesses 22 disposed outwardly from such transit vehicle 10 and cooperating with a pair of recesses (not shown) disposed within the outer wall 14 adjacent the door portal aperture 20.

The stairwell 30 having at least one step but typically contains a first, second and third step members 32, 34, and 36, respectively, disposed between a pair of stairwell side wall members 38. Such stairwell 30 enables ingress and egress from and onto a low platform 42. At passenger ingress and egress locations, both low platform 42 and high platform 44 are located adjacent door portal aperture 20 and separated by a distance 46 from the outer wall surface 12 of the transit vehicle 10. In this position, a passenger may ingress the vehicle from a low platform 42, being approximately 8 inches above top of rail surface (not shown), stepping onto the first step member 32 and further proceeding to the floor surface 48 of the transit vehicle 10.

Figure 3:
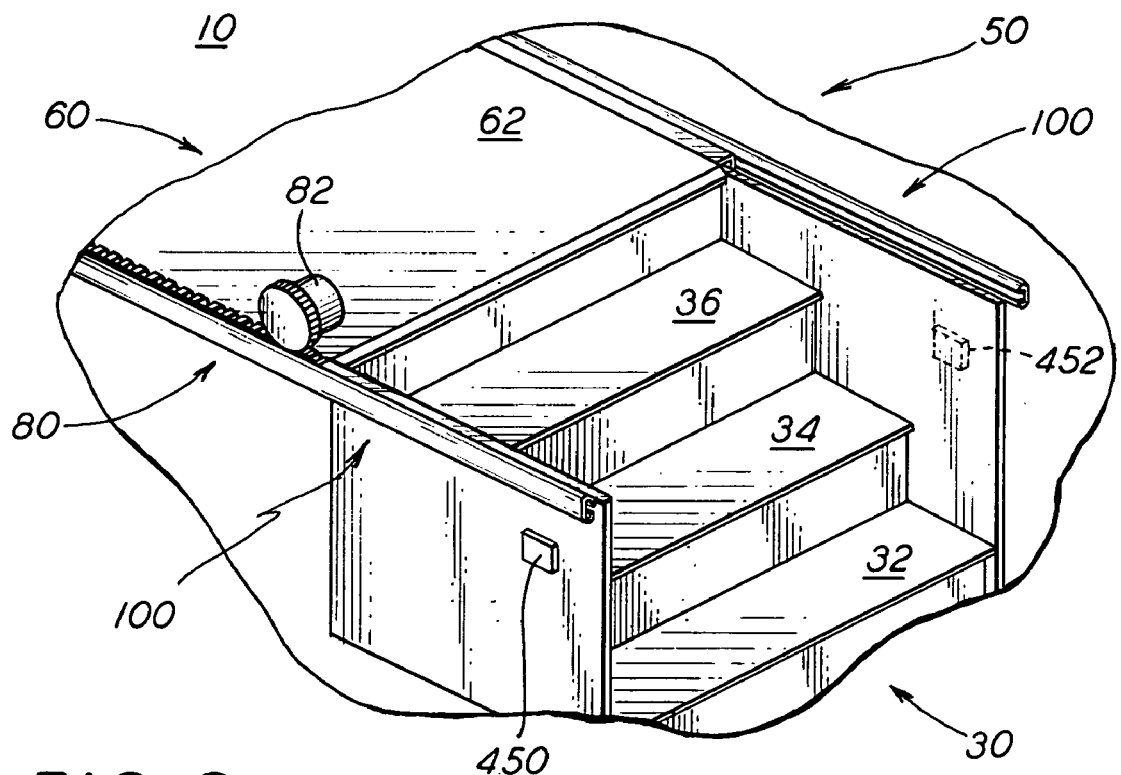
FIG. 3 is a perspective view of the stairwell of the transit vehicle with the stationary floor removed showing the disposition of the guide members.
Figure 4:
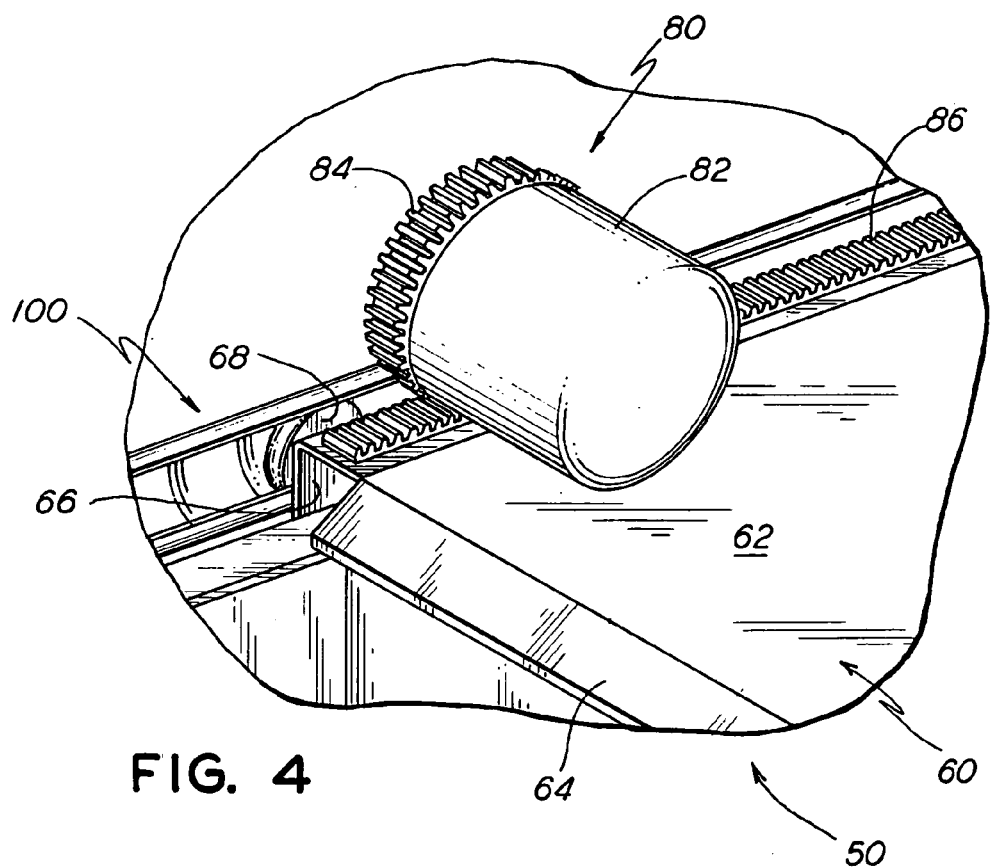
FIG. 4 is a partial perspective view of the present embodiment, particularly showing the manual driving means with interior wall structure removed.
Figure 5:
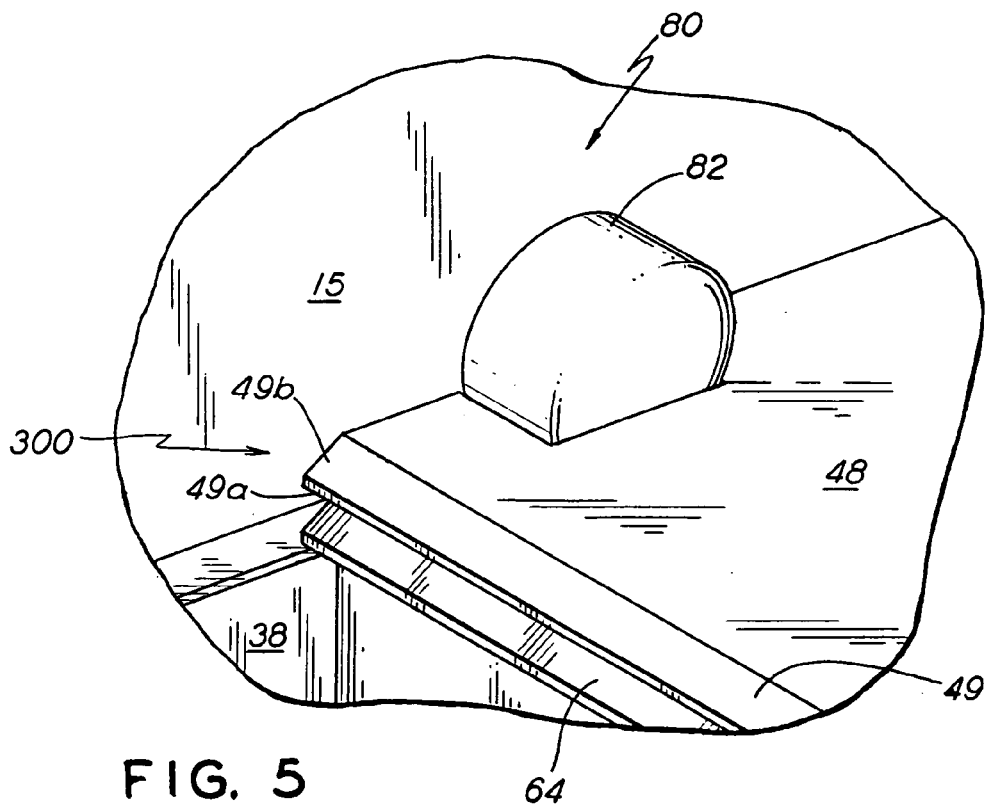
FIG. 5 is a partial perspective view of the present embodiment, particularly showing the manual driving means disposed adjacent an interior wall structure.

A movable platform apparatus, generally designated, 50, best shown in FIGS. 2–7, comprises a movable platform, generally designated, 60, a driving means, generally designated 80, disposed adjacent the movable platform 60, and a pair of guide means, generally designated 100, disposed within such stairwell 30. In some situations depending on the transit vehicle 10 design the driving means 80 may be disposed adjacent an interior wall structure 15, as best shown in FIG. 5.

In particular reference to FIGS. 3, 4 and 5, the movable platform 60 comprises a platform member 62 having a nose portion 64, a pair of support portions 66, each such support portion 66 attached to each side of the platform member 62 and at least one pair of rolling members 68 rotatably attached to each of the pair of support portions 66. The support portions 66 may be formed integrally on the platform member 62.

Driving means 80 comprise a foot wheel 82 disposed above the floor portion 48 and adjacent the interior wall structure 15. The foot wheel 82 is pivotably connected to the pinion 84 disposed behind the interior wall structure 15 and is hidden from access by passengers. The pinion 84 engages a rack 86 attached to one of the pair of support portions 66.

A pair of guide means 100 are disposed within a pair of cavities 39 of the stairwell side wall members 38 and extend under the floor portion 48. In the presently preferred embodiment, the guide means 100 comprise a pair of rails having a predetermined configuration to cooperate with at least two pairs of rolling members 68.

Figure 6:
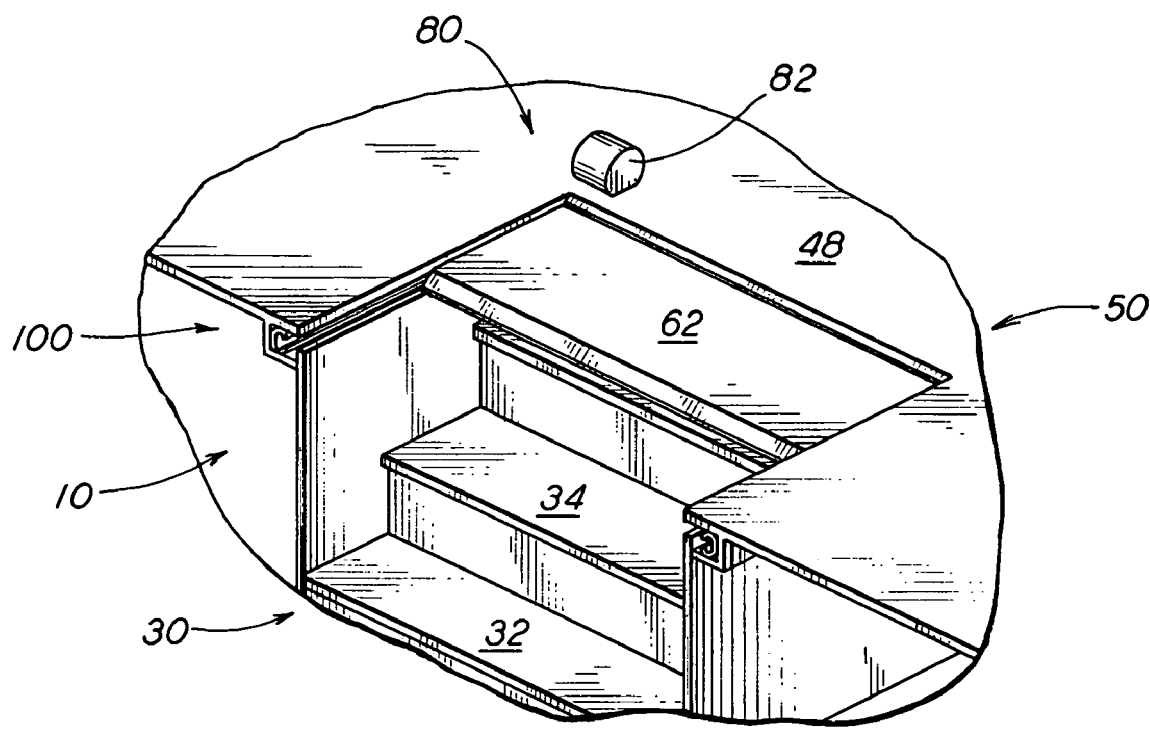
FIG. 6 is a perspective view of the present embodiment, particularly showing the movable member partially deployed over the stairwell.
Figure 7:
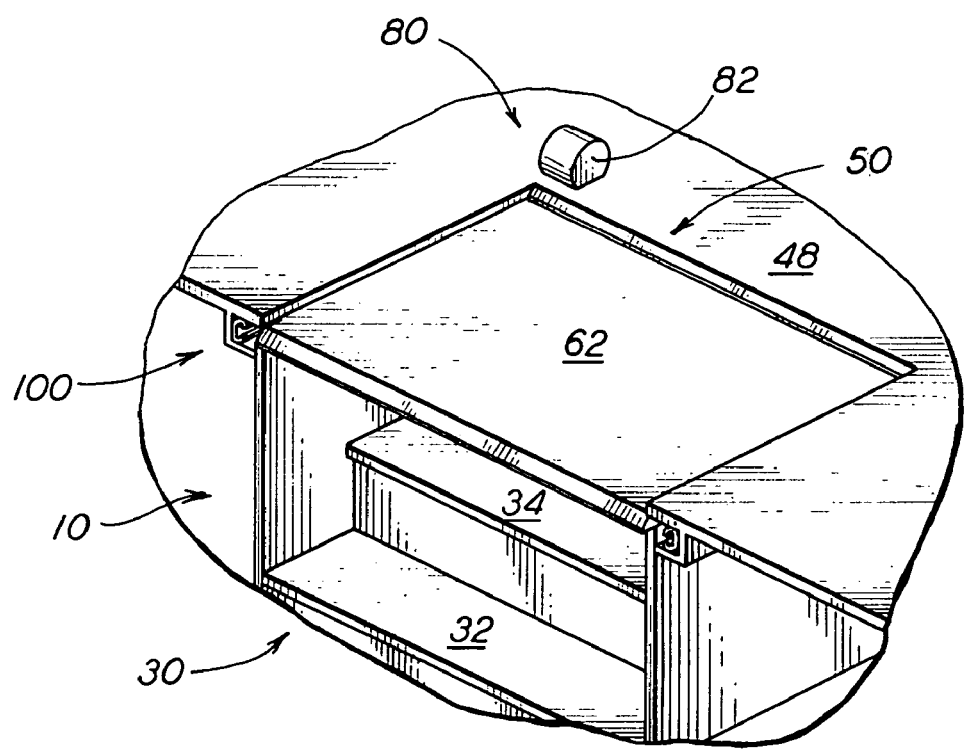
FIG. 7 is a perspective view of the present embodiment, particularly showing the movable member substantially deployed over the stairwell.

During egress and ingress to and from low platform 42 the movable platform 60 is disposed in the first position under the floor section 48 enabling the passengers to use the stairwell 30. For egress and ingress to and from high platform 44, the movable platform 60 can be deployed manually by rotating the foot wheel 82 enabling linear motion of the movable platform 60 due to the engagement of pinion 84 with the rack 86. As best shown in FIGS. 6 and 7, the movable platform 60 can be deployed over the stairwell 30 to a second position and further to a third position until the nose portion 64 fills at least part of the gap in compliance with ADA regulations or is disposed within the recess 22 of the first door 16 and the second door 18, minimizing the gap 46 with the high platform 44 prior to such first door 16 and such second door 18 opening.

Those skilled in the art will readily understand that the reduction of the platform gap 46 may be accomplished without presence of the recess 22 in the first door 16 and the second door 18.

The method of reducing the gap when the first door 16 and the second door 18 are of a simple construction having smooth outer surface consists of three steps.

In the first step, the movable platform 60 is deployed outwardly to a second position adjacent the interior portion of the first door 16 and the second door 18. In the second step, the first door 16 and the second door 18 are opened. In the third step, the movable member 60 is extended further to the third position to fill at least part of the gap 46 in compliance with ADA regulations.

In an alternative embodiment, the foot wheel 82 can be of a hand wheel type (not shown) disposed at a predetermined distance above the floor portion 48 and coupled to the pinion 84 by a variety of well known power transmission means, such as chain, cable, belt. Accordingly, the pinion 84 will be modified to couple to such well known power transmission means.

In the presently preferred embodiment, the driving means 80 may be of a powered type driven by an electric, pneumatic or hydraulic prime mover. The operation of this powered driving means 80 may be enabled by a control member (not shown) disposed within the transit vehicle 10.

Figure 9:
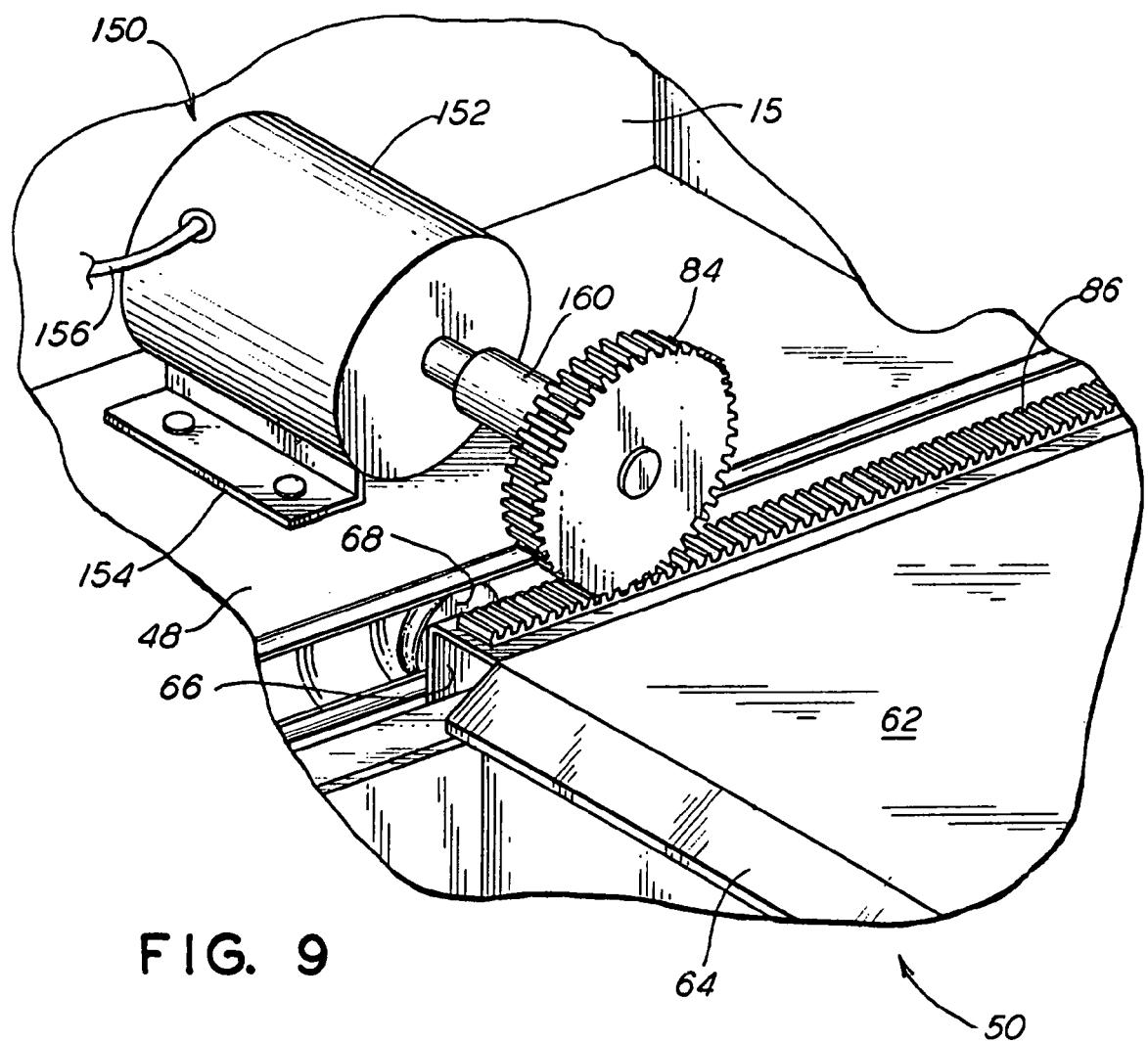
FIG. 9 is a partial perspective view of the present embodiment, particularly showing alternative driving means.

Reference is now made, more particularly, to FIG. 9, wherein a powered driving means, generally designated 150, of a presently preferred embodiment is illustrated. The powered driving means 150, mounted behind the interior wall structure 15, comprise a prime mover 152, preferably of an electric type, attached to the pinion 84 with an in-line coupling means 160. The prime mover 152 may be is mounted to the floor structure 48 at the mounting flange 154 with a threaded fasteners (not shown). A first electrical connection 156 connects the prime mover 152 with a power and a control source (not shown) of the transit vehicle 10. Those skilled in the relevant art will readily understand that the prime mover 152 can be mounted directly to the interior wall structure 15 by employing a coupling 160 of a right angle type. Those skilled in the relevant art will further understand that a pneumatic or hydraulic prime mover 150 can be utilized in place of the electric prime mover 150 when required.

Figure 10:
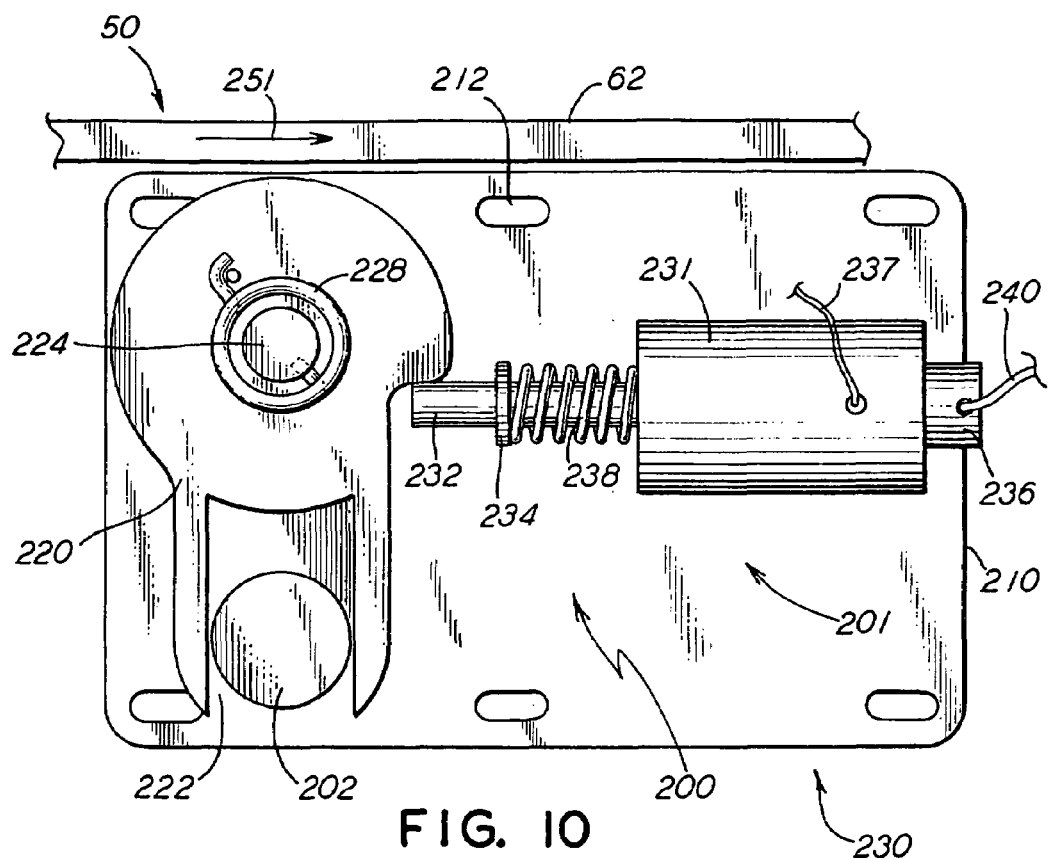
FIG. 10 is a partial elevation view of the present embodiment, particularly showing the locking mechanism in the locked condition.
Figure 11:
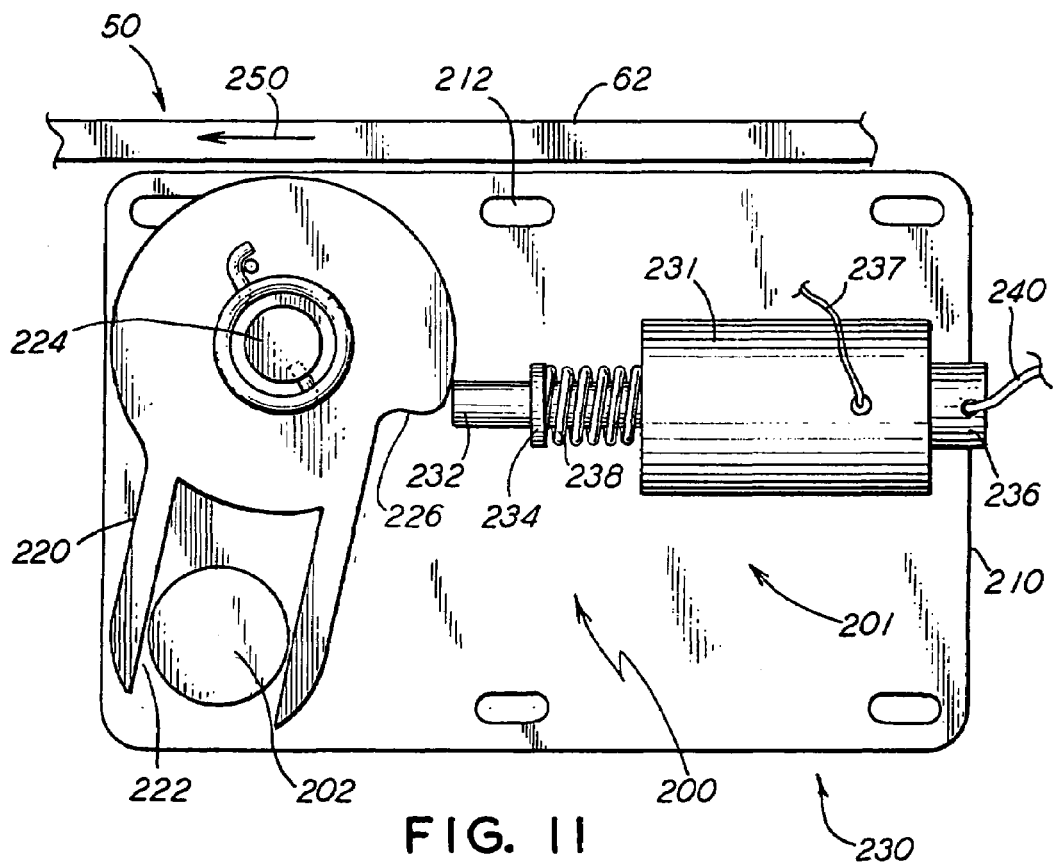
FIG. 11 is a partial elevation view of the present embodiment, particularly showing the locking mechanism in the unlocked condition.

In a further preferred embodiment of the present invention, as illustrated in FIGS. 10 and 11, the ingress and egress conversion system includes a locking means, generally designated 200, comprising at least one lock, generally designated 201, engaging at least one lock element, such as at least one lock pin 202, to secure the movable platform 60 in the first position as disposed below the floor portion 48. The at least one lock 201 comprise a base member 210 having at least one mounting cavity 212, a lock cam 220 pivotally mounted to the base member 210 at a first pivot 224, a lock actuator, generally designated 230, attached to the base member 210, and a first biasing spring means 228 mounted at the first pivot 224.

Such lock cam 220 has a lock cavity 222 for engaging the at least one lock pin 202 in the locked condition. The first biasing spring means 228 enable pivoting of the lock cam 220 in the clockwise direction and, more particularly, enable the movement of the platform member 62 in the deployment direction 250, as best illustrated in FIG. 11.

Preferably, the lock actuator 230 includes a movable actuator portion 232 engaging a lock step 226 of the lock cam 220 to prevent clockwise rotation of the lock cam 220 in the locked condition. The lock actuator 230 further includes an energized actuator portion 231 for withdrawing the moveable actuator portion 232 from engagement with the lock cam 220 to release the lock cam 220 and, more particularly, to unlock the platform member 62.

A second biasing spring means 238 encasing the movable actuator portion 232 intermediate the energized actuator portion 231 and a flange 234 bias such movable actuator portion 232 against the lock cam 220 to dispose the lock cam 220 in the locked condition upon rotation thereof.

The energized actuator portion 231 is an electrical actuator which, in the presently preferred embodiment, is a solenoid. The energized actuator portion 231 includes a control connection 237 with a control member (not shown) of the transit vehicle 10, which preferably, is a second electrical connection.

The lock actuator 230 additionally includes a movable member 236 coupled with the movable actuator portion 232 for manual unlocking of the platform member 62 via a cable 240 attached to a remotely mounted handle (not shown).

In reference to FIG. 10, the locking means 200 is shown in the locked condition. At least one lock pin 202 is engaged within the slot 222 and rotation of the lock cam 220 is prevented due to the engagement of the lock step 226 with the movable actuator portion 232. The second biasing spring means 238 biases the movable actuator portion 232 toward the lock cam 220 further enabling locked condition and counter reacting the first biasing spring means 228.

Upon receiving a control signal from the control member (not shown) of the transit vehicle 10, the lock actuator 230 energizes and the movable actuator portion 232 moves in the direction 251. Such movement disengages the movable actuator portion 232 from the lock step 226 enabling the first biasing spring means 228 to pivot the lock cam 220 in the clockwise direction and further enabling movement of the lock pin 202 in the direction 250. Thus, the platform member 62 is enabled to be deployed by its driving means 80 or 150.

In the locking direction, movement of the platform member 62 in the direction 251 engages at least one lock pin 202 with the lock cavity 222 and rotates lock cam 220 in the counter clockwise direction. Upon such rotation, the second biasing spring means 238 extend the movable actuator portion 232 in the direction 250 to maintain the lock cam 220 in the locked condition.

Manual unlocking of the platform member 62 is achieved by remotely actuating the handle (not shown) and enabling movement of the movable member 236 and, more importantly, the movable actuator portion 232 in the direction 251.

It will be understood that the at least one locking means 200 is mountable in relationship to the platform member 62 as permitted by the structure of the transit vehicle 10 and that the design of the lock pin 202 is varied accordingly.

It will be well understood that attachment of the at least one lock 201 and at least one lock pin 202 may be reversed between the stationary structure of transit vehicle 10 and movable platform apparatus 50.

In the presently preferred embodiment the at least one lock 201 mounted adjacent stairwell 30 and engaging a pair of lock pins 202 disposed at each end of the platform member 62 provides locking thereof in the third position and in the first position. The locking of the movable platform member 62 in the third (deployed) position is desirable with the use of a motorized wheelchair.

Alternatively, such at least one lock 201 attachable to the movable platform member 62 and engaging a pair of stationary lock pins 202 one at each end of the movable platform member 62 travel provide locking thereof in the third position and in the first position.

Yet alternatively a plurality of combinations comprising one lock 201 and one lock pin 202 may be used at each first and third positions.

As taught by U.S. Pat. Nos. 5,775,232 and 6,139,073, at least one electrical switch (not shown) disposed internally or remotely to the at least one locking means 200 can be used to provide lock status to the control member (not shown) of the transit vehicle 10 thus enabling interlocking and synchronization of the movable platform apparatus 50 with the operation of the first door 16 and a second door 18, as well as enabling an interface with an audible and visual annunciation (not shown) typical for the operation of the transit vehicle 10.

In a further presently preferred embodiment, a disability aid means, generally designated 300, compliant with ADA regulations are disposed within such floor portion 48 for enabling ingress and egress of disabled passengers and, more particularly, enabling ingress and egress of disabled passengers using a wheelchair.

The disability aid means 300 comprises a floor portion 48 of not more than 0.5 inches in thickness with a nose portion 49 formed by a combination of a first element 49a being of 0.25 inches maximum in thickness and disposed in the substantially vertical plane and a second element 49b being of a 0.25 inches maximum in thickness and disposed at 45 degree angle in respect to the first element 49a. Alternatively, in a situation where the floor portion 48 must be over 0.5 inches in thickness, as best shown in FIG. 5, such disability aid means 300 comprise a second element 49b of the nose portion 49 of the floor section 48 disposed inwardly into the transit vehicle 10 at a first predetermined angle enabling ingress and egress of disabled passengers.

Figure 13:
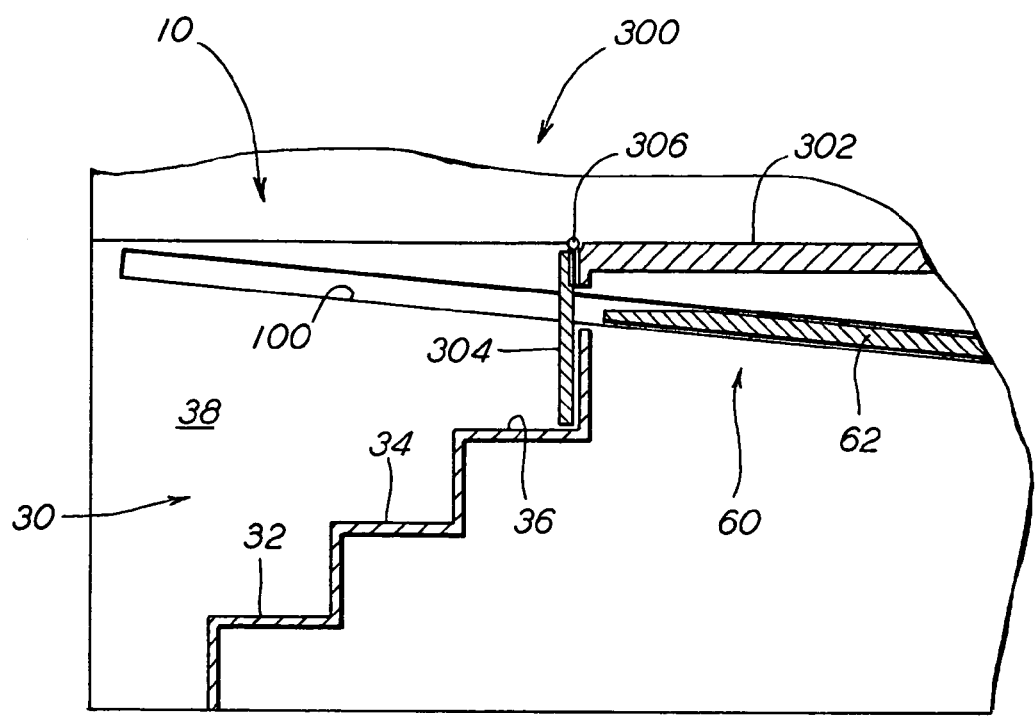
FIG. 13 is a partial elevation view of the present embodiment, particularly showing alternative disable aid means with the movable platform in the deployed position.
Figure 12:
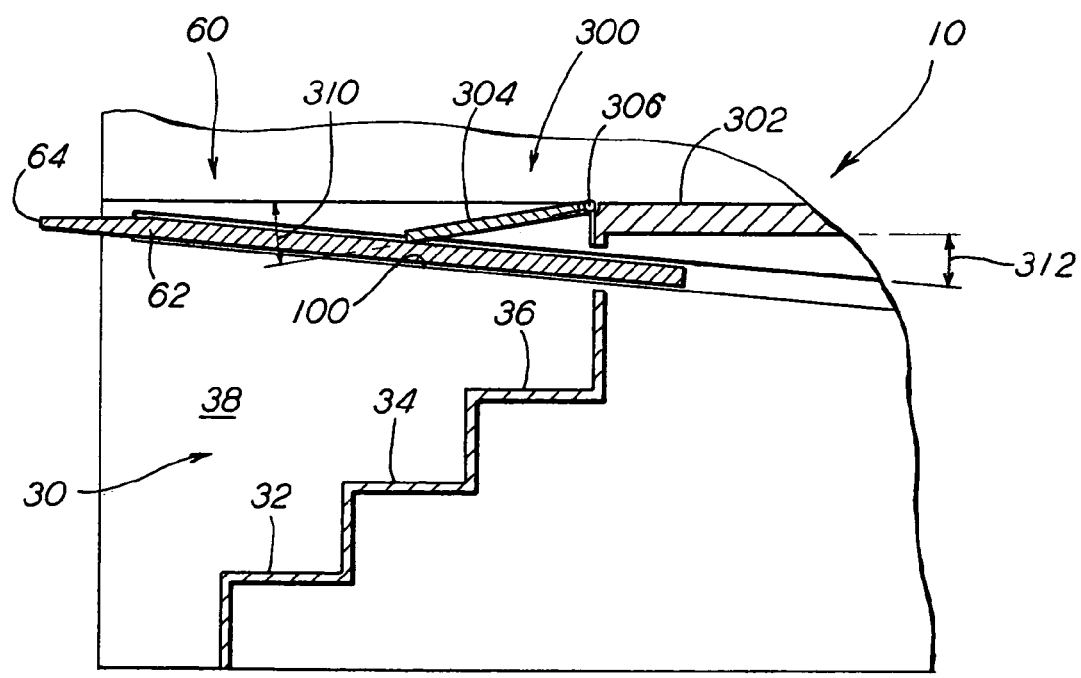
FIG. 12 is a partial elevation view of the present embodiment, particularly showing alternative disable aid means with the movable platform in the first or stowed position.

In a further situation, where a nose portion 49 can not be disposed at a first predetermined angle due to transit vehicle 10 design, such disability aid means 300 comprise a floor member 304, best shown in FIGS. 12 and 13, hinged to a floor member 302 enabling such ingress and egress of the disabled passengers. While the movable platform 60 is disposed in the first position, such floor member 304 is biased by a hinge 306 for disposition in the vertical plane within stairwell 30 additionally covering the platform member 62. Upon deployment of the platform member 62 toward the second position, the floor member 304 pivots in a clockwise direction, as shown in FIG. 12, to a second predetermined angle 310 for compliance with ADA regulations in respect to a vertical displacement between such movable platform 60 and the floor section 302. Additionally, the platform member 62 and guide means 100 are disposed about the floor portion 302 at a third predetermined angle 312 enabling, the nose portion 64 of the platform member 62 to be disposed substantially coplanar with such floor portion 302 in the third position.

Such first predetermined angle, such second predetermined angle and such third predetermined angle are 10.5 degree maximum.

Yet, in the presently most preferred embodiment of the invention, an obstruction detection means, generally designated 350, are disposed within the transit vehicle 10.

Figure 14:
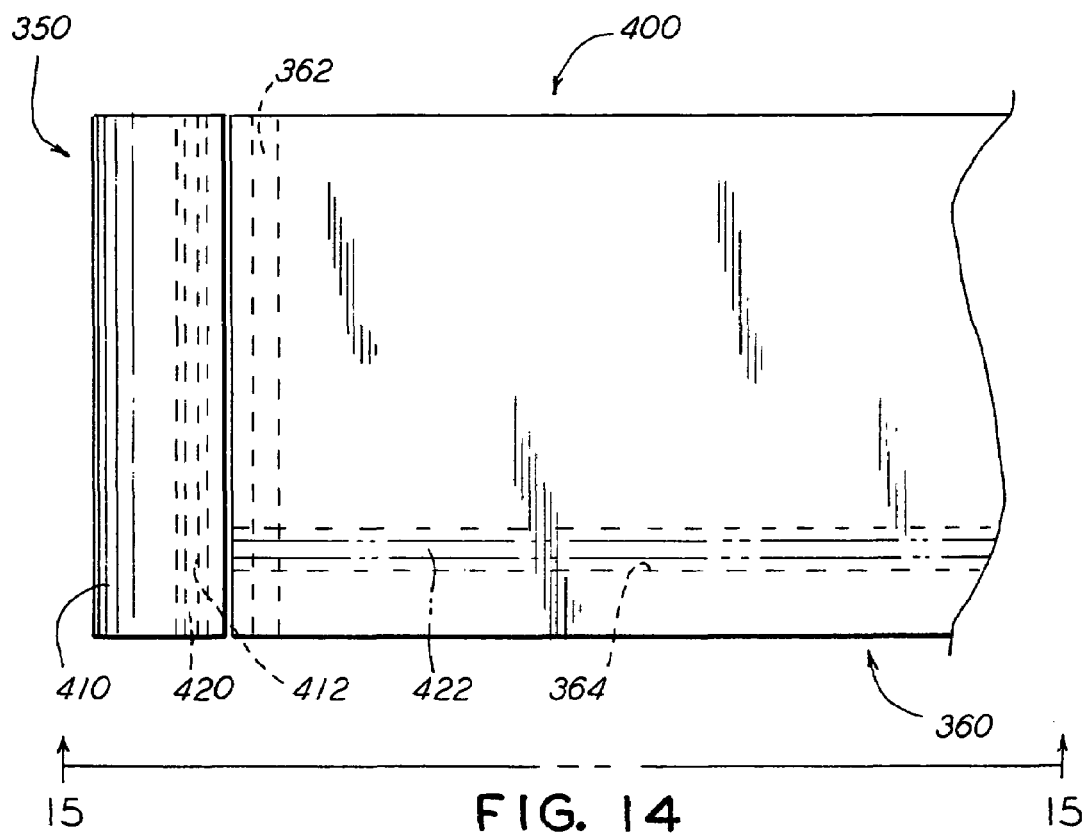
FIG. 14 is a partial planar view of the present embodiment, particularly showing the obstruction detection means of the present invention.
Figure 15:
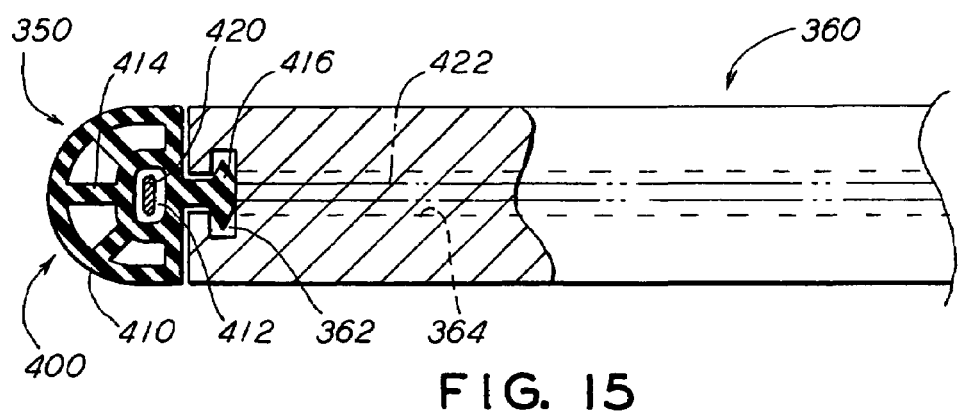
FIG. 15 is a partial elevation view of the present embodiment shown in FIG. 14, along the lines 15—15.
Figure 16:
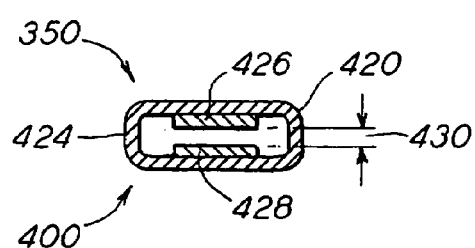
FIG. 16 is a partial cross-sectional elevation view of the present embodiment, particularly showing the construction of the sensing member.

As best shown in FIGS. 14 and 15, such obstruction detection means 350 comprise a sensing means, generally designated 400, coupled to the movable member 360.

The sensing means 400 comprise a sensing member 410 having a first longitudinal cavity 412 of a first predetermined size, at least one internal rib portion 414 and an attachment portion 416 disposed within a second cavity 362 of the movable member 360. Preferably such sensing member 410 is a rubber extrusion of a well known Neoprene of EPDM rubber compounds.

A sensing element 420 of a second predetermined size is disposed within the first longitudinal cavity 412 having a third electrical connection portion 422 routed through a third cavity 364 of the movable member 360 for connection to the control member (not shown). Such sensing element 420 preferably is of well known electric tape switch type. The sensing element 420 comprises a enclosure 424, a first contact 426 disposed on one surface of such enclosure 424, and a second contact 428 disposed on the opposite surface of such enclosure 424 and disposed substantially opposite the first contact 426. Both the first contact 426 and the second contact 428 are connected to the third electrical connection portion 422. A predetermined distance 430 is maintained between the first contact 426 and the second contact 428 under normal condition.

A passenger standing in the stairwell 30 during deployment of the movable member 360 will impact the sensing member 410 of the sensing means 400 resulting in compression thereof and, more particularly, resulting in at least one rib portion 414 exerting pressure onto the first longitudinal cavity 412. Such compression of the first longitudinal cavity 412 further compresses the enclosure 424 enabling coupling of the first contact 426 with the second contact 428 of the sensing element 420 and producing an electrical signal sent to the control member (not shown) through the third electrical connection portion 422.

Response of the control member (not shown) will either disable deployment of the movable member 360 or cause reversal movement thereof.

Alternatively, such obstruction detection means 350 may comprise a sensing member 410 of a sealed pressure chamber type and a connection portion 422 of a tubing of a first predetermined diameter connected to a well known pressure wave switch (not shown) having a forth electrical connection to the control member (not shown). A pressure applied to the sensing member 410 will generate a pressure differential at the pressure wave switch (not shown) and subsequently converted into an electrical signal sent to the control system (not shown). Response of the control system will either disable deployment of the movable member 360 or cause reversal movement thereof.

Yet alternatively, such obstruction detection means 350 may comprise a transmitter 450 disposed on one of the stairwell wall members 38 and a receiver 452 disposed on the opposite stairwell wall member 38. The transmitter 450 and the receiver 452 having a fifth electrical connection to the control member (not shown). A passenger standing in the stairwell 30 will disrupt a connection between the transmitter 450 and the receiver 452 sending an electrical signal to the control member (not shown) and, more importantly, preventing deployment of the movable member 360. Such transmitter 450 and receiver 452 may be one of a well known ultrasonic, photo element, or infrared type.

Further alternative obstruction detection means employ a method of deploying the movable platform 60 at a predetermined rate or at predetermined electrical current with the control member (not shown) monitoring such deployment and disabling thereof upon detecting changes to such predetermined rate or predetermined electrical current which will result from a force resisting such deployment when such movable platform contacts a either a passenger standing in the stairwell 30 or at least one door 16 (18) that has not moved in the opening direction.

It will be understood that since the movable platform 60 does not require mechanical coupling to the first door 16 and the second door 18, the first door 16 and the second door 18 may be of a plug type without affecting operation of the movable platform 60. It is well known that the first door 16 and the second door 18 of a plug type will be disposed substantially flush with the outer wall 12 of the transit vehicle 10. To enable passenger ingress and egress the first door 16 and the second door 18 of a plug type first move outwardly and than substantially linear along the outer wall 12 substantially exposing the door portal aperture 20. Employment of the first door 16 and the second door 18 of a plug type requiring only the outer wall 12 minimizes the initial gap from the high platform 44 by the width of the inner wall 14 and door cavity 13 and, more particularly, minimizes the deployment movement of the movable platform 60 to a third position after the first door 16 and the second door 18 of a plug type move in the opening direction. A further advantage of the first door 16 and the second door 18 of a plug type is that the powered movable platform 60 is fully deployed during the outward movement of the first door 16 and the second door 18 of a plug type, substantially eliminating the need for recess 22.

It will be further understood that the first door 16 and the second door 18 movable in a linear path substantially along the outer wall 12 of the transit vehicle 10 offers additional benefits wherein such movable platform 60 is deployed to the third position before such first door 16 and such second door 18 begin to open.

As it has been described hereinbefore, the movable platform apparatus 50 cooperates with a pair of bi-parting first door 16 and the second door 18 of a sliding or plug type for at least partially covering and uncovering door portal aperture 20. Those skilled in the art can easily recognized that operation of the movable platform apparatus 50 will be identical in the case of a single door 16 or 18 of either sliding or plug type for covering and uncovering such door portal aperture 20.

Figure 17:
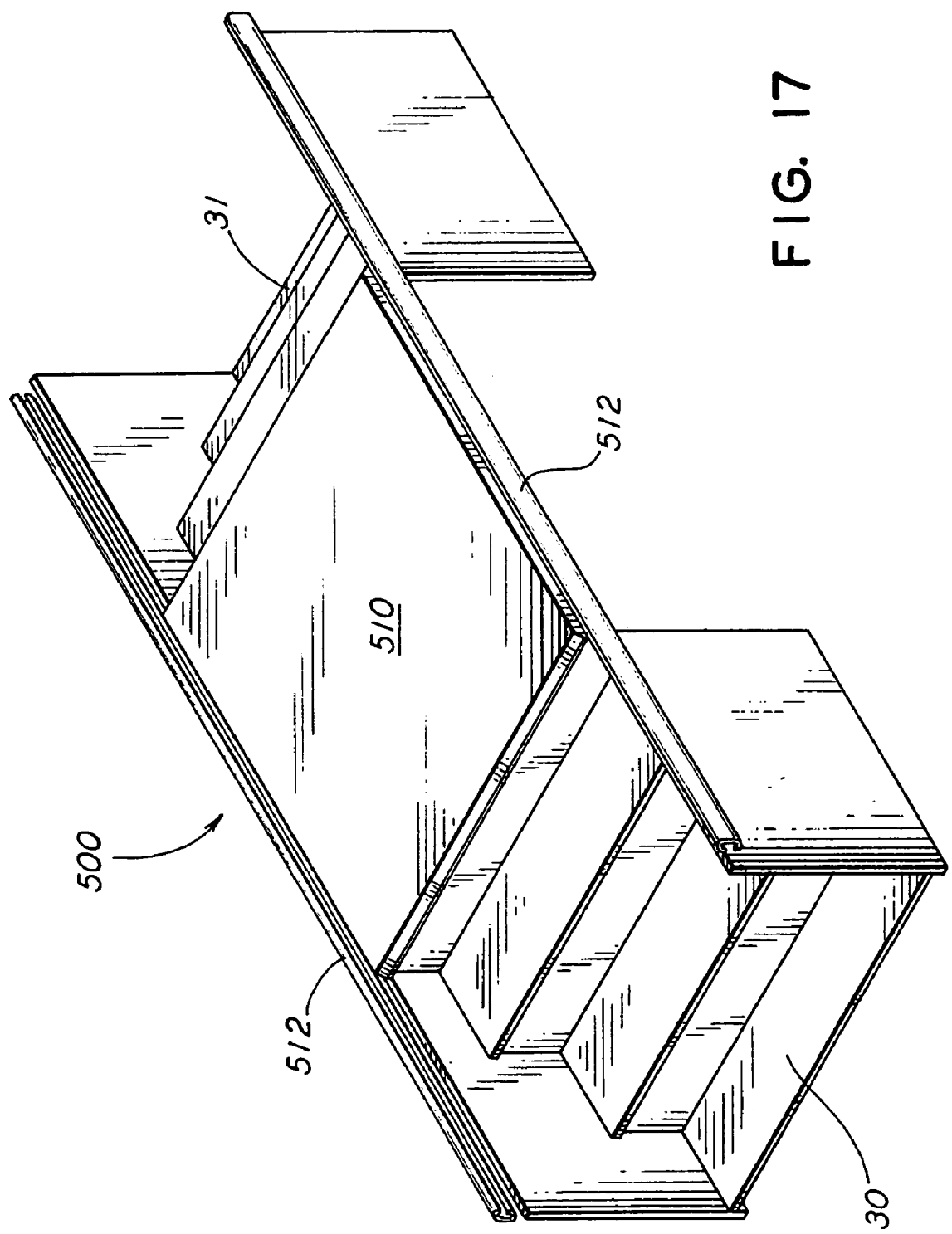
FIG. 17 is partial perspective view of the present embodiment, particularly showing a dual stairwell configuration.

Now in particular reference to FIG. 17, there is shown a movable platform, generally designated 500, for enabling passenger ingress and egress from either side of the transit vehicle 10. A first stairwell 30 is disposed adjacent a first door portal aperture (not shown) in the first wall (not shown) of the transit vehicle 10. A second stairwell 31 is disposed adjacent a second door portal aperture (not shown) in the second wall (not shown) of the transit vehicle 10, substantially opposite the first stairwell 30.

A pair of guide rails 512 extending across the transit vehicle 10 enable movement of the movable platform 510 in the first direction for substantial covering of the first stairwell 30 and further enable movement of the movable platform 510 in the second direction for substantial covering of the second stairwell 31. In operation the direction of the movement is determined by the rotational direction of the manual drive means (not shown) or by the control system in a powered drive means application.

Although a presently preferred and various alternative embodiments of the present invention have been described in considerable detail above with particular reference to the drawing FIGURES, it should be understood that various additional modifications and/or adaptations of the present invention can be made and/or envisioned by those persons skilled in the relevant art without departing from either the spirit of the instant invention or the scope of the appended claims.

I claim:

1. A movable platform apparatus for a transit vehicle having at least an outer wall, said transit vehicle further having a door portal aperture formed through said at least outer wall, said door portal aperture having at least one door for at least partially covering and uncovering said door portal aperture, said transit vehicle additionally having a stairwell formed within a floor portion of said transit vehicle adjacent said door portal aperture, said stairwell having at least one step member, said movable platform apparatus for cooperating with a low stationary platform having a surface disposed horizontally at a height of under 14 inches from a ground level and with a high stationary platform having a surface disposed horizontally at a height greater than 14 inches from said ground level, said movable platform apparatus comprising:

(a) a movable platform having a platform member including a nose portion, said movable platform further having a pair of support portions, each of said pair of support portions attached to each side of said platform member, said movable platform additionally having at least one pair of rolling members rotatably attached to each of said pair of said support portions;
   (b) a rack attached to one of said pair of said support portions;
   (c) a pinion engaging said rack;
   (d) a driving means coupled to said pinion, said driving means being one of a foot operated wheel disposed above said floor portion adjacent an interior wall structure of said transit vehicle and a hand operated wheel disposed at a predetermined distance above said floor portion, said hand wheel coupled to said pinion by a power transmission means, said power transmission means is selected from one of a chain, cable, and belt, said pinion has a predetermined configuration for coupling to said power transmission means; and
   (e) a pair of guide means disposed within said stairwell under said floor portion.

2. A movable platform apparatus according to claim 1, wherein said pair of support portions are formed integral to said platform member.

3. A movable platform apparatus according to claim 1, wherein said pair of guide means is a pair of rails having a predetermined configuration to cooperate with at least two pairs of said rolling members.

4. A movable platform apparatus for a transit vehicle having at least an outer wall, said transit vehicle further having a door portal aperture formed through said at least an outer wall, said door portal aperture having at least one door for at least partially covering and uncovering said door portal aperture, said transit vehicle additionally having a stairwell formed within a floor portion of said transit vehicle adjacent said door portal aperture, said stairwell having at least one step member, said movable platform apparatus for cooperating with a low stationary platform having a surface disposed horizontally at a height of under 14 inches from a ground level and with a high stationary platform having a surface disposed horizontally at a height greater than 14 inches from said ground level, said movable platform apparatus comprising:

(a) a movable platform including a platform member having a nose portion, said movable platform further including a pair of support portions, each of said pair of support portions attached to each side of said platform member, said movable platform additionally including at least one pair of rolling members rotatably attached to each of said pair of said support portions;
   (b) a rack attached to one of said pair of said support portions;
   (c) a pinion engaging said rack;
   (d) a prime mover coupled to said pinion with a coupling means disposed intermediate said prime mover and said pinion, said prime mover having a connection to a power source of said transit vehicle and a first electrical connection to a control member of said transit vehicle, said prime mover is enabled by said control member to selectively move said platform member in a direction towards said at least one door for enabling ingress and egress to and from said high stationary platform and in a direction away from said at least one door for enabling ingress and egress to and from said low stationary platform;
   (e) a pair of guide means disposed within said stairwell under said floor portion; and
   (f) an obstruction detection means coupled to said nose portion of said platform member.

5. A movable platform apparatus according to claim 4, wherein said prime mover is one of an electrical, pneumatic, and hydraulic prime mover.

6. A movable platform apparatus according to claim 4, further comprising a locking means disposed within said movable platform apparatus, said locking means comprising:
  (a) at least one lock having:
    (i) a base member having at least one mounting cavity;
    (ii) a lock cam pivotally mounted to said base member at a first pivot, said lock cam having a lock cavity;
    (iii) a lock actuator attached to said base member, said lock actuator having a movable actuator portion engaging a lock step of said lock cam for preventing rotation of said lock cam in an unlocking direction while said movable member is maintained in a locked position, said lock actuator further having an energized actuator portion for withdrawing said moveable actuator portion from engagement with said lock cam for enabling rotation of said lock cam in an unlocking direction, said lock actuator additionally having a second biasing spring means encasing said movable actuator portion intermediate said energized actuator portion and a flange disposed on said movable actuator portion, said second biasing spring means for biasing said movable actuator portion against said lock cam in said locked position;
    (iv) a first biasing spring means mounted at said first pivot, said first biasing spring means enabling pivoting of said lock cam in said unlocking direction, said first biasing spring means further enabling movement of said platform member in a deployment direction; and
  (b) at least one lock pin engageable with said lock cavity of said lock cam in a locked condition.

7. A movable platform apparatus according to claim 6, wherein said energized actuator portion is a solenoid having a second electrical connection with said control member of said transit vehicle.

8. A movable platform apparatus according to claim 6, wherein an attachment and a disposition of said at least one lock and said at least one lock pin is reversible between said transit vehicle and said movable platform apparatus, said at least one lock engaging said at least one lock pin for securing said movable platform in said first position disposed below said floor portion, said at least one lock engaging said at least one lock pin for securing said movable platform in said third position deployed outwardly to at least partially fill a gap between said high platform and said outer wall of said transit vehicle.

9. A movable platform apparatus according to claim 6, further comprising a cable attached to a movable member of said lock actuator at one end, said cable attached to a remotely mounted handle at a distal end, said movable member coupled to said movable actuator portion of said lock actuator, said cable for manual unlocking of said platform member.

10. A movable platform apparatus according to claim 6, further comprising at least one electrical switch cooperating with said locking means, said at least one electrical switch for enabling an interlocking and a synchronization of said movable platform apparatus movement with an operation of said at least one door.

11. A movable platform apparatus according to claim 4, wherein said sensing means comprising:

(a) a sensing member having a first longitudinal cavity of a first predetermined size, at least one internal rib portion, and an attachment portion;
  (b) said platform member having a second cavity disposed within said nose portion for accepting said attachment portion of said sensing member, said platform member further having a third cavity; and
  (c) a sensing element of a second predetermined size disposed within said first longitudinal cavity of said sensing member, said sensing element having a third electrical connection portion routed through said third cavity of said movable member for connection to said control system of said transit vehicle.

12. A movable platform apparatus according to claim 11, wherein said sensing element comprising an enclosure, a first contact disposed on one surface of said enclosure, and a second contact disposed on the opposite surface of said enclosure, said second contact disposed substantially opposite said first contact, said first contact and said second contact connected to said third electrical connection portion, said first contact is maintained at a predetermined distance in respect to said second contact under normal condition, said first contact coupling said second contact upon compression of said sensing member enabling further compression of said enclosure of said sensing element, said coupling producing an electrical signal sent to said control member via said third electrical connection portion of said sensing member.

13. A movable platform apparatus according to claim 12, wherein said sensing member is a rubber extrusion.

14. A movable platform apparatus according to claim 4, wherein said sensing means comprising:
  (a) a sensing member of a sealed pressure chamber type having an attachment portion, said sensing member further having a connection portion of a first predetermined diameter;
  (b) said platform member having a second cavity disposed within said nose portion for accepting said attachment portion, said platform member further having a third cavity for accepting said connection portion of said nose member; and
  (c) a pressure wave switch having a forth electrical connection to said control member, said pressure wave switch further connected to said connection portion of said first predetermined diameter, said pressure wave switch for converting a pressure differential generated upon compression of said nose member into an electrical signal sent to said control member.

15. A movable platform apparatus according to claim 4, wherein said obstruction detection means further includes a means for moving said platform member at one of a predetermined rate and at a predetermined electrical current, monitoring movement of said platform member with said control member, and disabling said movement upon said control member detecting changes to said one of said predetermined rate and said predetermined electrical current.

* * * * *